United States Patent
Huelser et al.

(10) Patent No.: US 7,416,037 B2
(45) Date of Patent: Aug. 26, 2008

(54) DEVICE AND METHOD FOR REGULATING THE DRIVING SPEED OF A VEHICLE

(75) Inventors: Holger Huelser, Graz (AT); Volkmar Foelsche, Heilbronn (DE); Frank Bickendorf, Ditzingen (DE); Rainer Kallenbach, Waiblingen (DE)

(73) Assignee: Robert Bosch GmbH, Stuttgart (DE)

( * ) Notice: Subject to any disclaimer, the term of this patent is extended or adjusted under 35 U.S.C. 154(b) by 2 days.

(21) Appl. No.: 11/654,062

(22) Filed: Jan. 16, 2007

(65) Prior Publication Data

US 2007/0114084 A1 May 24, 2007

Related U.S. Application Data

(62) Division of application No. 10/468,540, filed as application No. PCT/DE02/04516 on Dec. 10, 2002, now abandoned.

(30) Foreign Application Priority Data

Dec. 18, 2001 (DE) ................ 101 62 017

(51) Int. Cl.
*B60K 6/00* (2007.10)
*B60K 31/00* (2006.01)
*B60W 20/00* (2006.01)

(52) U.S. Cl. ............. 180/65.2; 180/170; 903/930
(58) Field of Classification Search ............ 180/65.1, 180/65.2, 170, 178, 179; 903/947, 948, 930; 701/22
See application file for complete search history.

(56) References Cited

U.S. PATENT DOCUMENTS

| | | | |
|---|---|---|---|
| 4,093,900 A | 6/1978 | Plunkett | |
| 5,081,365 A * | 1/1992 | Field et al. | 290/45 |
| 5,234,071 A | 8/1993 | Kajiwara | |
| 5,346,031 A * | 9/1994 | Gardner | 180/179 |
| 5,544,056 A * | 8/1996 | Seireg et al. | 701/93 |
| 5,710,699 A | 1/1998 | King et al. | |
| 5,747,959 A | 5/1998 | Lijima et al. | |
| 5,823,280 A | 10/1998 | Lateur et al. | |
| 6,019,183 A * | 2/2000 | Shimasaki et al. | 180/165 |
| 6,059,064 A | 5/2000 | Morisawa et al. | |
| 6,122,588 A | 9/2000 | Shehan et al. | |
| 6,183,389 B1 * | 2/2001 | Tabata | 477/5 |
| 6,209,672 B1 | 4/2001 | Severinsky | |

(Continued)

FOREIGN PATENT DOCUMENTS

DE     42 26 469     2/1993

(Continued)

*Primary Examiner*—Frank B Vanaman
(74) *Attorney, Agent, or Firm*—Kenyon & Kenyon LLP

(57) ABSTRACT

A device and a method implementable therewith for regulating the driving speed of at least one vehicle, having an electric motor/generator connected or connectable to a drive train for at least one wheel as a function of at least its actual speed and setpoint speed. The device includes a control unit for controlling the torque of the electric motor/generator, an arrangement for driving the electric motor/generator, an arrangement for recording the actual speed of the vehicle and an arrangement for preselecting the setpoint speed of the vehicle. In the device, the electric motor/generator is usable in generator operation to generate a braking torque and in engine operation to generate a driving torque.

7 Claims, 4 Drawing Sheets

U.S. PATENT DOCUMENTS

| | | |
|---|---|---|
| 6,278,916 B1 | 8/2001 | Crombez |
| 6,291,902 B1 * | 9/2001 | Ogane et al. .................. 290/34 |
| 6,430,483 B2 * | 8/2002 | Takaoka et al. ............... 701/22 |
| 6,484,833 B1 | 11/2002 | Chhaya et al. |
| 6,621,244 B1 * | 9/2003 | Kiyomiya et al. ........... 318/611 |
| 6,719,076 B1 * | 4/2004 | Tabata et al. ............... 180/65.7 |

FOREIGN PATENT DOCUMENTS

| | | |
|---|---|---|
| DE | 196 18 865 | 11/1997 |
| DE | 199 14 428 | 11/2000 |
| DE | 199 37 381 | 3/2001 |
| DE | 199 55 313 | 5/2001 |
| EP | 09 83 894 | 3/2000 |
| FR | 2742100 | 6/1997 |
| JP | 10-23603 | 1/1989 |
| JP | 6-319205 | 11/1994 |
| JP | 8-251708 | 9/1996 |
| JP | 9-163506 | 6/1997 |
| JP | 2001-157305 | 6/2001 |
| JP | 2001-158249 | 6/2001 |
| JP | 2001-191814 | 7/2001 |

\* cited by examiner

DEVICE AND METHOD FOR REGULATING THE DRIVING SPEED OF A VEHICLE

CROSS-REFERENCE TO RELATED APPLICATIONS

This application is a divisional application of U.S. application Ser. No. 10/468,540, filed on Feb. 12, 2004 now abandoned, which in turn is a U.S. national phase application under 35 U.S.C. §371 based on international PCT Application No. PCT/DE02/04516 filed on Dec. 10, 2002, which in turn claimed priority to German Patent Application No. 101 62 017.9, filed on Dec. 18, 2001.

FIELD OF THE INVENTION

The present invention relates to a device for regulating the driving speed of a vehicle, and a method for regulating the driving speed of a vehicle.

BACKGROUND INFORMATION

Devices and methods of the type indicated here are available. They are also referred to as ACC systems (adaptive cruise control), speed governors or cruise control, and they are used to regulate the speed of vehicles.

Vehicles are available which also have an electric motor/generator in the drive train in addition to an internal combustion engine. Such an electric motor/generator in the drive train of a motor vehicle is also referred to as a starter generator, a crankshaft starter generator or an integrated starter generator.

German Patent Document No. 199 14 428 refers to a device of the type mentioned here, in which the braking torque of an electric motor/generator in the drive train is used in combination with an automatic cruise control and distance regulating system. When the motor vehicle is driven, the electric motor/generator connected to the engine is always operated as a generator to decelerate the engine and thus supply a load torque to the drive train.

SUMMARY OF THE INVENTION

In the exemplary device according to the present invention, the at least one electric motor/generator provided in the vehicle may be used in a variety of ways in combination with the device (cruise control) for regulating the driving speed of the vehicle, i.e., not only for deceleration but also for acceleration of the vehicle. According to the exemplary embodiment of the present invention, the electric motor/generator is to be operated either in generator operation or in engine operation, the particular mode of operation of the cruise control being set as a function of at least the instantaneous (actual) speed and a preselectable setpoint speed and at least one additional parameter, if necessary.

The device may be used in vehicles having an internal combustion engine and an electric motor/generator as well as in vehicles driven exclusively by at least one electric motor/generator.

The device includes a control unit for controlling the torque of the electric motor/generator and an arrangement for driving the electric motor/generator by which a desired torque (driving torque or braking torque) may be preselected. In addition, an arrangement is provided for determining the actual speed of the vehicle, as well as an arrangement being provided for preselecting the setpoint speed of the vehicle. The actual speed may be determined in a wide variety of ways, e.g., by a sensor which detects the rotational speed of a wheel. Several possibilities are also conceivable for preselecting the setpoint speed, e.g., an occupant of the vehicle, in particular the driver, may preselect a desired speed via an operating element. The arrangement for preselecting the setpoint speed may also include a device for setting the distance of the vehicle from an object, in particular a vehicle driving in front (cruise control and distance regulating system, e.g., an ACC system). According to a third variant, a setpoint speed is preselected for the control unit via a data connection, e.g., a satellite connection.

The exemplary embodiment of the present invention also relates to a drive system for a vehicle having at least one electric motor/generator and, if necessary, an engine as described herein.

The exemplary embodiment of the present invention also relates to a method as described herein, wherein at an actual speed higher than the setpoint speed, the vehicle is required to decelerate and for this purpose, the electric motor/generator is operated as a generator, and at an actual speed lower than the setpoint speed, the electric motor/generator is operated as an engine. If the vehicle also has an internal combustion engine in addition to the electric motor/generator, the torque required by a cruise control as a function of the actual speed and the setpoint speed of the vehicle is applied optionally by the electric motor/generator or by the internal combustion engine or by the electric motor/generator and the internal combustion engine, depending on the design of the drive system, and this torque is transmitted to at least one wheel of the vehicle. To this end, strategies for optimally distributing the required torque optimally between the electric motor/generator and the internal combustion engine may be stored in the control unit of the cruise control. If the sum of the torques transmitted to the at least one wheel is greater than the road resistance acting on the vehicle, this results in acceleration of the vehicle, whereas when the sum of these torques is less than the road resistance, this results in a deceleration (braking) of the vehicle.

Alternatively or additionally, to reduce the driving speed of the vehicle, a braking device assigned to at least one wheel of the vehicle may also be operated. Therefore, the driving speed may be reduced even more than may be possible through the internal combustion engine and the electric motor/generator alone.

DETAILED DESCRIPTION

Several exemplary embodiments of a device 1 for automatic regulation of the driving speed of a vehicle, e.g., passenger vehicles, trucks, buses or the like, are described in greater detail below with reference to the figures.

Figure 1:
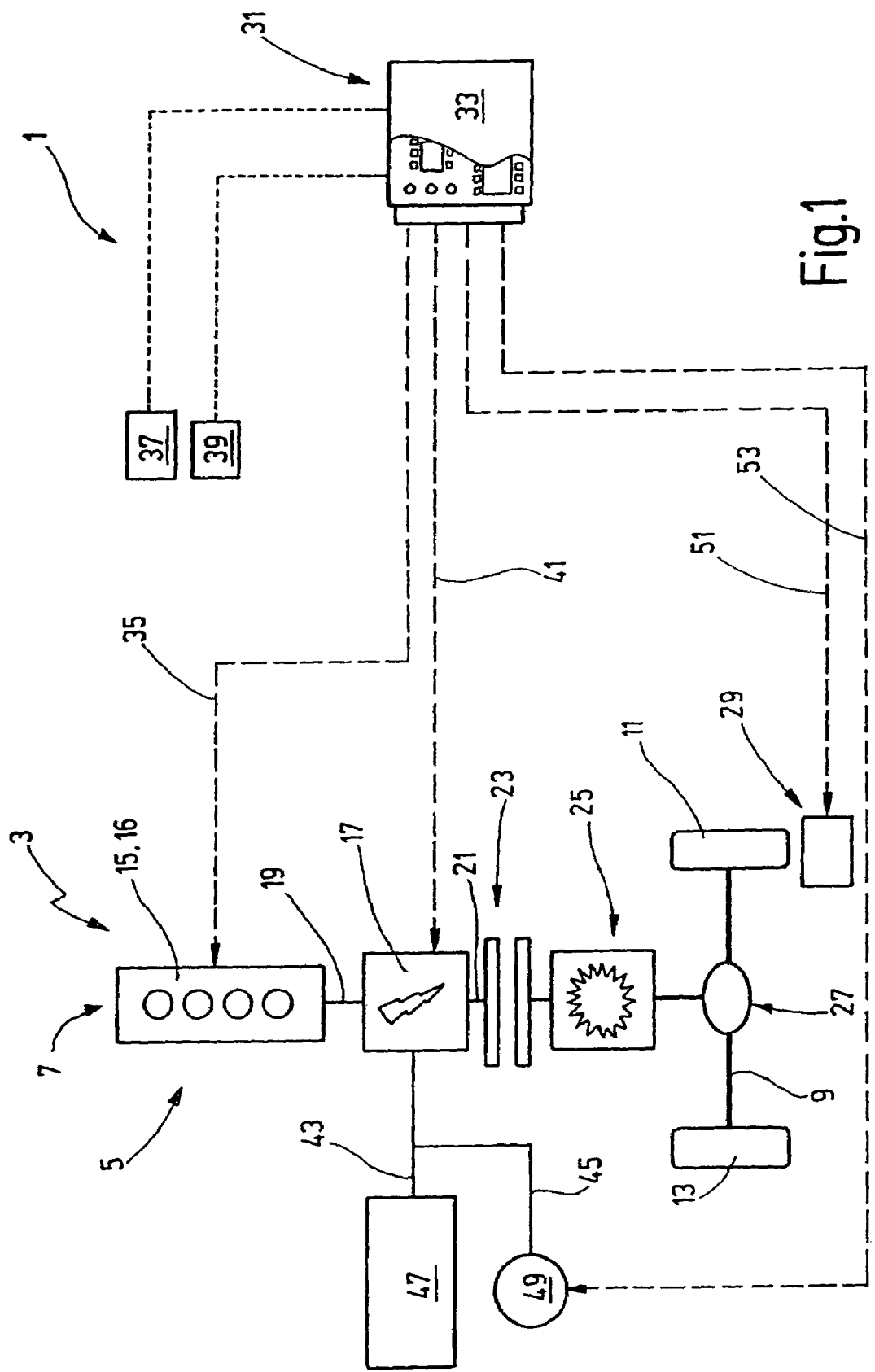
FIG. 1 shows a basic diagram of a drive system for a vehicle.

FIG. 1 shows a basic diagram of a first exemplary embodiment of device 1 for a vehicle 3 (not shown in detail), having a drive system 5 with a drive train 7. Drive train 7 is used to drive wheels 11 and 13 mounted on axle 9.

Drive system 5 has an engine 15, formed here by an internal combustion engine 16, and an electric motor/generator 17, the rotor of which (not shown) is in a rotationally fixed connection with crankshaft 19 of internal combustion engine 16 and also with an input part 21 of a clutch 23, e.g., a friction clutch. In a first shift position, clutch 23, which may be operated electrically or mechanically, for example, allows crankshaft 19 of internal combustion engine 16 and the rotor of electric motor/generator 17 to rotate without sending a torque (driving or braking torque) to wheels 11, 13.

As an alternative to clutch 23, a torque converter may also be used.

Furthermore, a transmission 25, e.g., a standard transmission or an automatic transmission, and a differential 27 are also provided in drive train 7. It remains to be pointed out that clutch 23, transmission 25 and differential 27 are optional devices that are not essential for implementing the method according to the present invention.

With clutch 23 engaged, both internal combustion engine 16 and electric motor/generator 17 are in a suitable connection with wheels 11, 13 for transmitting a torque via the rotor of the electric motor/generator, clutch 23, transmission 25 and differential 27, so that a driving torque or a braking torque is transmittable to the wheels. In this embodiment of drive system 5, internal combustion engine 16 and electric motor/generator 17 may always be used jointly to accelerate or decelerate vehicle 3. A preselectable torque may be applied to wheels 11, 13 only via electric motor/generator 17, e.g., when there is a failure in internal combustion engine 16 or when vehicle 3 (hybrid) is to be driven only by electric power. Also, only internal combustion engine 16 may be used to supply a torque to wheels 11, 13 while electric motor/generator 17 is in an inactive mode.

Vehicle 3 also has a brake 29 for braking wheels 11, 13. Brake 29 may be assigned to only one wheel of vehicle 3, as indicated in FIG. 1, or to multiple wheels. The design and functioning of such a brake 29 are available, so they need not be described in greater detail here.

Device 1 includes a control unit 31 having at least one electronic control device 33 via which the torque of internal combustion engine 16 is controllable, as indicated by a control arrow 35 shown with broken lines. By varying the torque of internal combustion engine 16, the speed of vehicle 3 may be varied. Electronic control device 33 includes an arrangement 37 for determining the prevailing instantaneous speed of vehicle 3 and an arrangement 39 for preselecting a setpoint speed of vehicle 3. The arrangements 37, 39 are available, so they need not be described in greater detail here.

Instead of the single electronic control device 33, control unit 31 may also have a plurality of control devices interconnected by data links.

Electric motor/generator 17 may be used either as a generator or as a motor in operation of vehicle 3. In generator operation, electric motor/generator 17 may apply a torque to decelerate (brake) vehicle 3, and in engine operation it may apply a torque to accelerate (drive) vehicle 3. Electric motor/generator 17 also includes essentially available arrangements for driving whereby a desired torque may be preselected. This may be accomplished via electronic control device 33, which is indicated by a control arrow 41, shown as a broken line.

Electric motor/generator 17 is connected by electric lines 43 and 45 to a current storage device 47, e.g., a battery, and at least one consumer 49, e.g., a heating or air conditioning system. In motor operation of electric motor/generator 17, current storage device 47 supplies power for driving vehicle 3; in generator operation, current storage device 47 and consumer 49 receive the current generated.

The function of device 1: to adjust the speed preselected via an arrangement 39, electronic control device 33 demands a torque from internal combustion engine 16 and/or electric motor/generator 17. Therefore strategies for distributing the torque optimally between engine 16 and motor/generator 17 may be stored in electronic control device 33. If the sum of the torques supplied by internal combustion engine 16 and electric motor/generator 17 to wheels 11, 13 is greater than the road resistance acting on vehicle 3, this results in acceleration of vehicle 3. In the other case, i.e., when the sum of the torques transmitted to wheels 11, 13 from internal combustion engine 16 and electric motor/generator 17 is lower than the road resistance, this results in a deceleration of vehicle 3. When electronic control device 33 wishes to reduce the speed of vehicle 3 because the prevailing speed of vehicle 3 detected via an arrangement 37 is greater than the setpoint speed preselected via an arrangement 39, brake 29 may be actuated by electronic control device 33, as indicated with a control arrow 51 shown with a broken line, and to thereby reduce the speed even more than may be possible simply using internal combustion engine 16 and electric motor/generator 17.

It may be particularly advantageous if, in the case when vehicle 3 is to be decelerated, electronic control device 33 also increases the electric power consumption by at least one electric consumer 49 should current storage device 47 be unable to accept all of the current generated by electric motor/generator 17, and the deceleration of vehicle 3 due to the braking torque of electric motor/generator 17 is not sufficient. The driving of electric consumer 49 by electronic control device 33 is indicated with a control arrow 53, shown with a broken line.

An exemplary embodiment for regulating the driving speed which is described below may be used in a motor vehicle having a drive system which includes at least one electric motor/generator and at least one internal combustion engine, i.e., as described with reference to FIG. 1, for example.

When the cruise control described above is activated, it attempts to keep the speed of the vehicle constant or essentially constant, resulting in considerable changes in the driving torque required when driving over hilly terrain. Therefore, according to the exemplary embodiment of the present invention, the driving torque is to be regulated largely with the help of the electric motor/generator and with the most constant possible use of the internal combustion engine. The engine provides a basic driving torque, which is obtained from the vehicle dynamics equation. This basic driving torque is set at an operating point of the engine at which fuel consumption and/or emissions are as low as possible or at least lower. Short-term fluctuations in the required total driving torque are compensated exclusively by the electric motor/generator. The connection to a CVT transmission or automatic transmission and a coordinated drive train control provides another potential for optimization. Therefore, the engine may be operated at the lowest possible rotational speed (or at least a lower speed) and, in the case of gasoline engines, with as little throttling as possible. The advantage is that engines (internal combustion engines) may be favorable in terms of fuel consumption here and may even be operated with low emissions, and furthermore, the torque of an electric motor and thus also the effect to be achieved is usually greatest at low rotational speeds.

The method described above is explained in greater detail below with reference to FIG. 4. Graph I shows torque $M_E$ supplied by the electric motor/generator, torque $M_B$ supplied by the internal combustion engine and the desired/necessary total driving torque $M_G$ composed of the individual torques as a function of the altitude profile of the road as shown in graph II. To keep the driving speed constant, if the resulting speed is too high, it is compensated by regenerative braking (charging the battery), and if the driving speed is too low, it is compensated by a positive torque delivered by the electric motor/generator. The torque of the internal combustion engine is regulated up or down via an integrator only after lengthy battery charging or discharging phases (t>$T_{max}$) and the percentage of the total driving torque contributed by the electric motor/generator approaches zero again accordingly. In other words, the torque of the engine is constant during the period of time from $t_0$ to $t_6$, and it increases only after time $t_6$ because at this point in time, the discharge phase of the battery is greater than $T_{max}$ and the torque of the electric motor/generator approaches zero again. If the additional torque of the electric motor/generator is not sufficient to maintain the desired target speed (setpoint speed) of the vehicle, either the torque of the engine or the gear ratio is adjusted.

Figure 4:
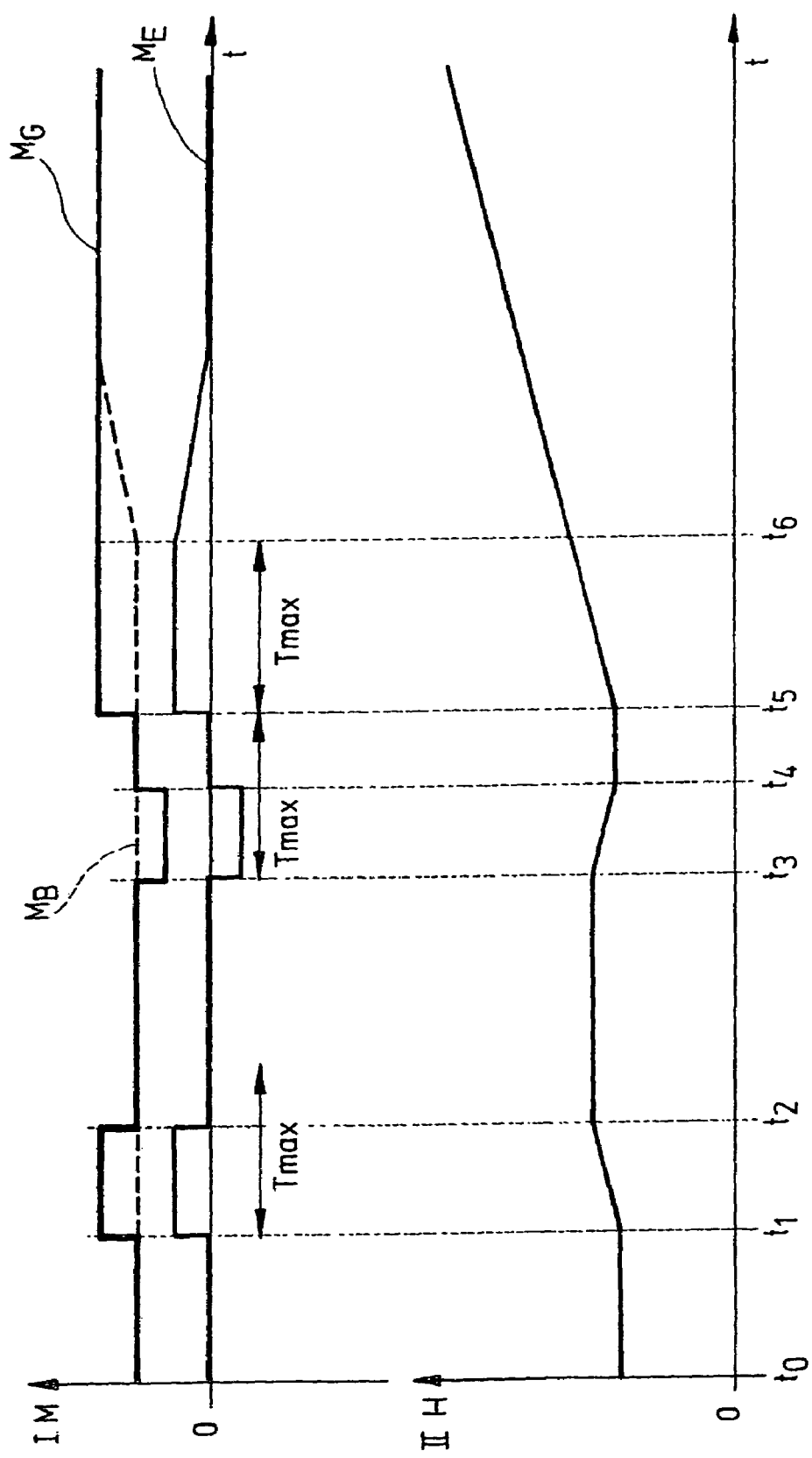
FIG. 4 shows two graphs in which the total demand for driving torque at a constant driving speed (graph I) is plotted as a function of the altitude profile of the road on which the vehicle is traveling (graph II).

It is readily apparent from FIG. 4 that when the cruise control is active, the total torque required to keep the vehicle constantly at a desired speed is consistently divided between the electric motor/generator and the engine. In the case of a flat driving surface and driving surfaces having a constant slope, the desired speed is regulated down with a high precision and a low activity on the part of the cruise control. Only by dividing the total driving torque and refraining from changes in the operating point of the engine as much as possible, may fuel consumption be minimized (or at least reduced) even when driving over long distances at a constant speed.

Figure 2:
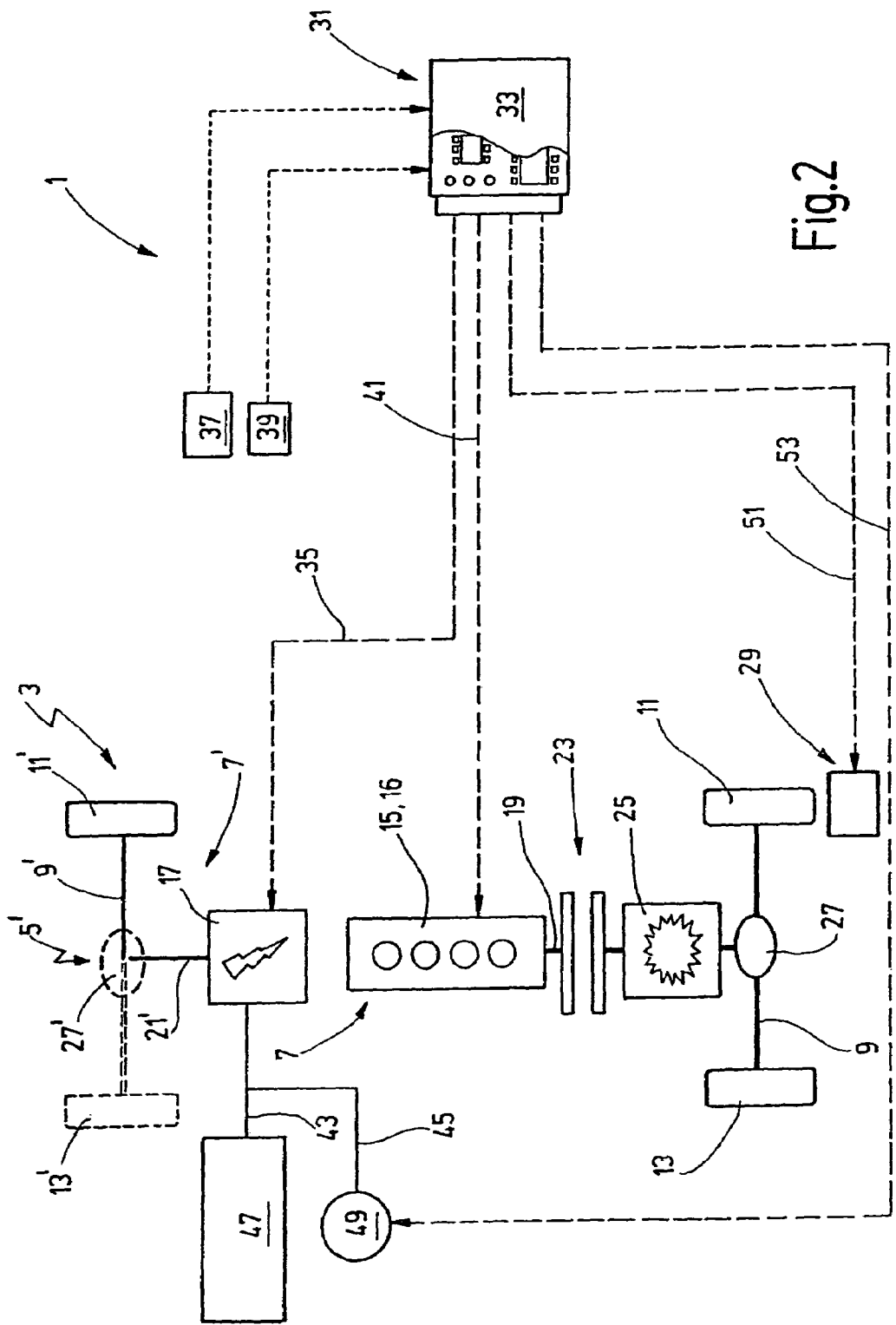
FIG. 2 shows another basic diagram of a drive system for a vehicle.

FIG. 2 shows a basic diagram of the second exemplary embodiment of device 1. The same parts are labeled with the same reference numbers, so that reference is made in this regard to the description of FIG. 1. Therefore, only the differences are described in greater detail below.

Vehicle 3 has a drive system 5' having first and second drive trains 7 and 7', of which drive train 7 is allocated to wheels 11, 13 of axle 9 (front or rear axle) and the other drive train 7' is allocated to a wheel 11' of a second axle 9' (rear or front axle). First drive train 7 includes engine 16, clutch 23, transmission 25 and differential 27 and is used to drive wheels 11, 13. Second drive train 7' includes electric motor/generator 17, which is connected in a rotationally fixed manner by its drive part 21 to wheel 11' of the other axle 9' of vehicle 3, so that the wheel receives a driving torque or a braking torque.

Broken lines in FIG. 2 indicate that in another variant, electric motor/generator 17 may additionally also drive at least one other wheel 13' on axle 9' via a differential 27'. In a third variant (not shown) of second drive train 7' at least two electric motors/generators are provided, each being connected to one wheel 11', 13' in a manner capable of transmitting torque. In a fourth variant (not shown) drive train 7 allocated to axle 9 has a design identical to that of drive train 7 described with respect to FIG. 1, while at least one additional drive train 7' allocated to axle 9' or only to wheel 11' is designed as described above.

The method of regulating the driving speed of the exemplary embodiment described with reference to FIG. 2 corresponds essentially to the method described with reference to FIG. 1. In other words, electronic control device 33 may demand of electric motor/generator 17 and engine 16, independently of one another, a torque which depends on the actual speed and the setpoint speed of vehicle 3. Therefore, wheel 11' or wheels 11' and 13' of second axle 9' and wheels 11 and 13 of first axle 9 may receive different torques, which may be advantageous in certain driving situations.

The exemplary embodiment according to FIG. 2 differs from that described with reference to FIG. 1 in that engine 16 and electric motor/generator 17 may be triggered independently of one another, and another axle or at least one wheel per vehicle axle may be driven independently of the other wheel. It should be pointed out that the drive system shown in FIG. 2 permits four-wheel drive.

Figure 3:
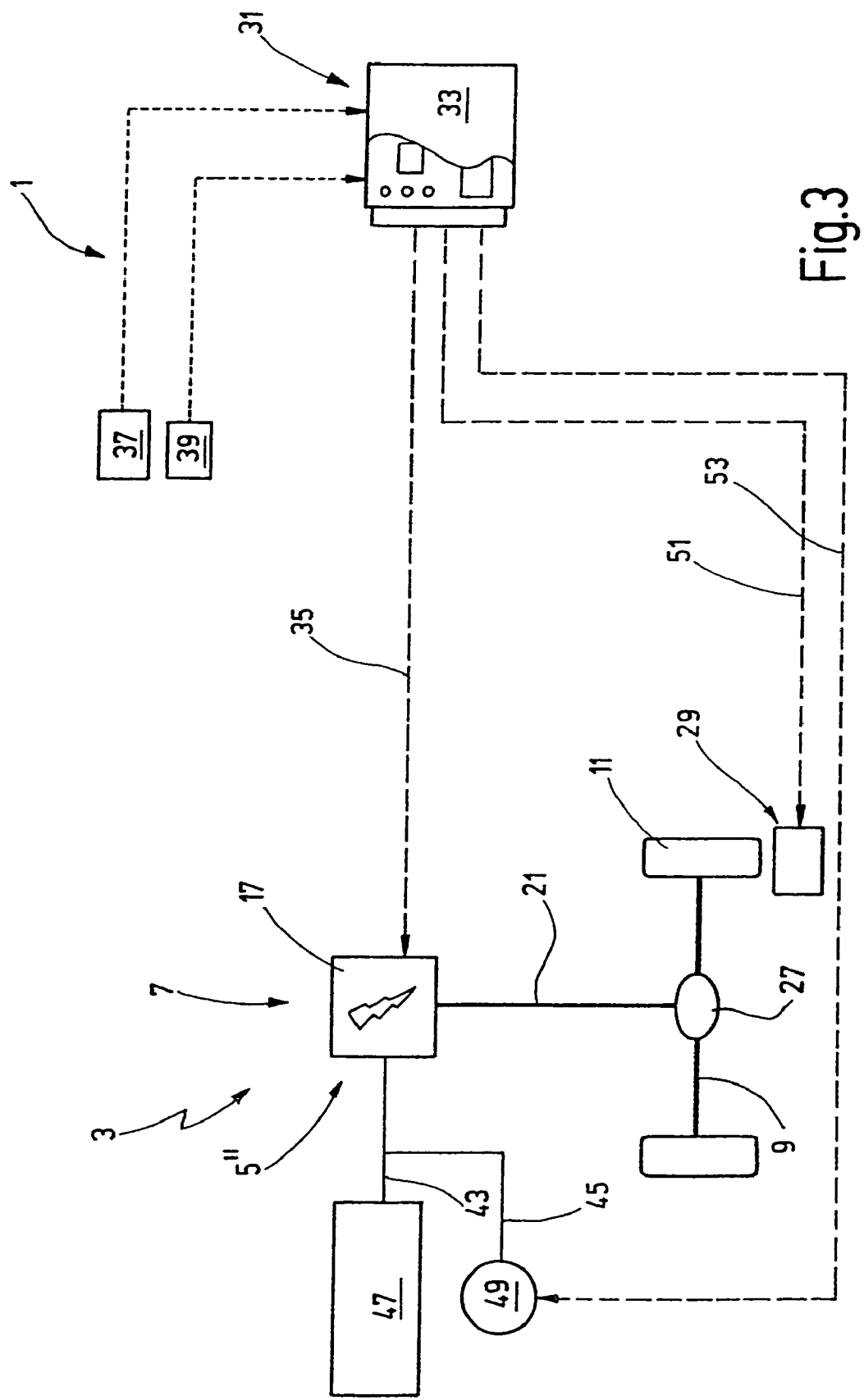
FIG. 3 shows another basic diagram of a drive system for a vehicle.

FIG. 3 shows a basic diagram of a third exemplary embodiment of device 1. Parts that have already been described on the basis of FIGS. 1 and 2 are labeled with the same reference numbers. Therefore, reference is made to the description of FIGS. 1 and 2. The vehicle has a drive system 5" having only one drive train 7 which includes at least one electric motor/generator 17 but no internal combustion engine. Thus this is a strictly electric vehicle. Electric motor/generator 17 is connected here directly via drive part 21 and differential 27 to both wheels 11, 13 of axle 9 in a rotationally fixed manner. As an alternative, differential 27 may be eliminated and electric motor/generator 17 may be connected directly to only one wheel 11, 13. In another variant, a plurality of electric motors/generators is provided, each driving one wheel of the vehicle, and these wheels may be on different axles.

In the exemplary embodiment shown in FIG. 3, neither a clutch 23 nor a transmission 25 is provided in drive train 7. However, these devices may be provided in drive train 7.

In drive system 5" shown in FIG. 3, instead of at least one battery as current storage device 47, at least one fuel cell, which may be a plurality of fuel cells, may be provided as the source of the current.

The method implementable by the exemplary embodiment illustrated in FIG. 3 for regulating the driving speed of vehicle 3 is like the methods described on the basis of FIGS. 1 and 2. Thus, if electronic control device 33 ascertains that the prevailing driving speed of vehicle 3 detected via an arrangement 37 is lower than the setpoint speed preselected via an arrangement 39, then electronic control device 33 demands a positive torque from electric motor/generator 17, resulting in acceleration of vehicle 3. If, based on a comparison of the actual speed and the setpoint speed, electronic control device 33 demands deceleration of vehicle 3, then a negative torque is required of electric motor/generator 17 via data connection 35. Here again, it is advantageous if control device 33 also actuates brake 29 for at least one wheel 11 to decelerate vehicle 3 even more if the negative torque of electric motor/generator 17 alone is not sufficient. Finally, electronic control device 33 may increase electric power consumption by at least one electric consumer 49 if current storage device 47 is unable to consume all the current generated by electric motor/generator 17 in generator operation and the deceleration achieved through the braking torque of electric motor/generator 17 is not sufficient.

What is claimed is:

1. A method of regulating a driving speed of a vehicle having at least one electric motor/generator, as a function of at least its actual speed and the required setpoint speed, the method comprising:
   determinating the actual speed, the setpoint speed being adjustable;
   comparing the actual speed with the setpoint speed;
   if the actual speed is greater than the setpoint speed, decelerating the vehicle by operating the electric motor/generator as a generator;
   if the actual speed is less than the setpoint speed, operating the electric motor/generator as a motor; and
   wherein at least one of a short-term fluctuation and a minor fluctuation in the driving torque required to keep the vehicle at a constant speed are compensated exclusively by the at least one electric motor/generator;

whereby, after a certain period of time during which fluctuations in the driving torque are compensated exclusively by the at least one electric motor/generator, the torque of the internal combustion engine is regulated up or down via an integrator, and a contribution of the at least one electric motor/generator to a total driving torque is returned to zero.

2. The method of claim 1, wherein, if the actual speed is greater than the setpoint speed, at least one brake cooperating with at least one wheel of the vehicle is actuated to increase a braking torque.

3. The method of claim 1, wherein a torque of an internal combustion engine of the vehicle is varied to decelerate and accelerate the vehicle.

4. The method of claim 1, wherein when there is at least one electric consumer, and electric power consumption is increased if at least one current storage device is not able to receive all current generated by the at least one electric motor/generator during generator operation, and deceleration of the vehicle due to a braking torque of the electric motor/generator is not sufficient.

5. The method of claim 1, wherein when the at least one electric motor/generator is operated as a motor, it is supplied with current by the at least one current storage device for driving the vehicle, and when the at least one electric motor/generator is operated as a generator, its generated current is at least one of stored by the at least one current storage device and consumed by the at least one electric consumer.

6. The method of claim 1, wherein an excessive driving speed of the vehicle is compensated by regenerative braking, and when the driving speed is too low, the driving speed is compensated by the at least one electric motor/generator supplying a driving torque.

7. The method of claim 1, further comprising:
if a torque supplied by the at least one electric motor/generator is not sufficient to maintain a required setpoint speed, adjusting one of the torque of the internal combustion engine and a gear ratio accordingly.

* * * * *